United States Patent [19]

Becker et al.

[11] Patent Number: 4,900,960
[45] Date of Patent: Feb. 13, 1990

[54] ELECTRIC ACTUATOR WITH OUTPUT SHIELD AND MATING GEAR

[75] Inventors: Herbert Becker; Gerhard Schelhorn, both of Coburg; Claus Dallwig, Rödenthal/Bld; Dieter Pöschl, Steinbach am Wald; Hans J. Volk, Ebersdorf OT Frohnlach, all of Fed. Rep. of Germany

[73] Assignee: Brose Fahrzeugteile GmbH & Co. Kommanditgesellschaft, Coburg, Fed. Rep. of Germany

[21] Appl. No.: 255,547

[22] Filed: Oct. 7, 1988

[30] Foreign Application Priority Data

Oct. 7, 1987 [DE] Fed. Rep. of Germany ....... 3733922

[51] Int. Cl.⁴ .................... H02K 7/116; F16H 1/16
[52] U.S. Cl. ......................... 310/85; 74/425; 310/83; 310/89
[58] Field of Search ............ 310/83, 89, 91, 42; 74/80, 85, 90, 425

[56] References Cited

U.S. PATENT DOCUMENTS 4,713,568 12/1987 Adam et al. .................... 310/83
4,774,848 10/1988 Zupancic ........................ 74/425

FOREIGN PATENT DOCUMENTS 2040389 8/1980 Fed. Rep. of Germany ........ 310/83
1326240 3/1963 France ................................ 310/83

*Primary Examiner*—Patrick R. Salce
*Assistant Examiner*—D. L. Rebsch
*Attorney, Agent, or Firm*—Toren, McGeady & Associates

[57] ABSTRACT

An electric actuating bolt motor with a gear unit for use in a motor vehicle, the motor including a shaft rotatably supported in a motor housing and a toothed part arranged externally of the housing, and further including a bearing shield, an attachment flange and an aperture side wall which embraces the toothed part, the bearing shield also having an end wall in whose region a bearing area for the shaft is provided. The bearing shield prevents damage to the shaft and the toothed part of the actuating motor prior to its assembly with the gear unit.

12 Claims, 1 Drawing Sheet

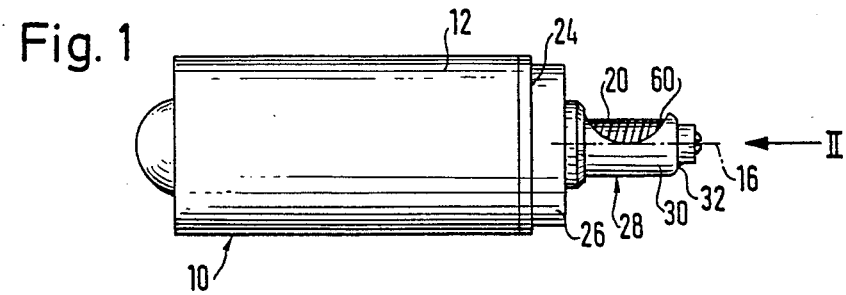
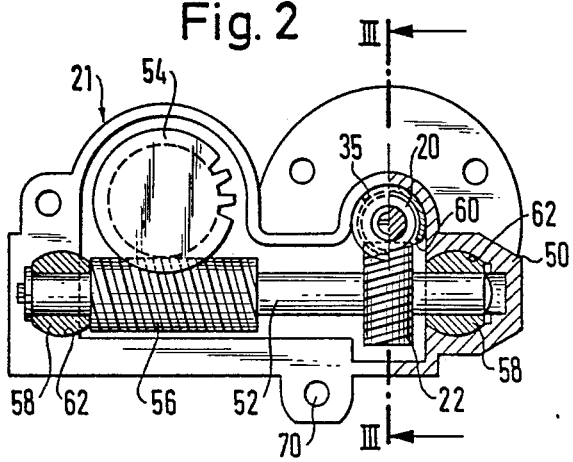
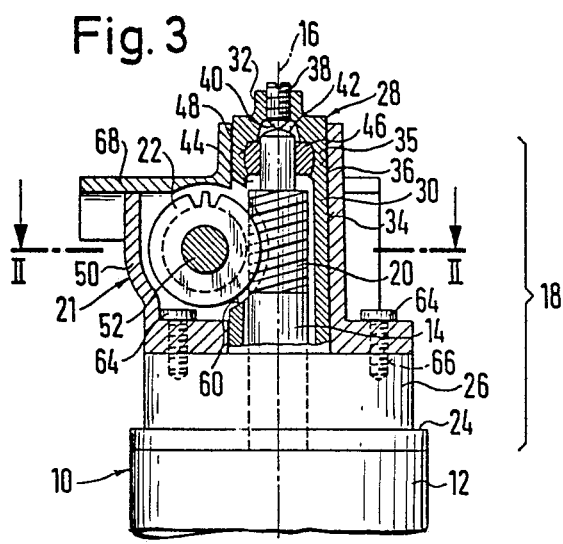

ELECTRIC ACTUATOR WITH OUTPUT SHIELD AND MATING GEAR

BACKGROUND OF THE INVENTION:

1. Field of the Invention:

The present invention relates to an electric actuating motor with a gear unit for use in a motor vehicle. The motor includes a shaft rotatably supported in a housing, and the shaft includes a shaft end section arranged outside of the housing, with a first toothed part which meshes with a second toothed part supported in a gear unit housing.

Such electric motors are utilized especially for electrical adjustment of, for example, a motor vehicle seat, a window lifting mechanism or in connection with belt transmitter mechanisms. In known electromotors, the shaft end section projects freely from the motor housing before assembly of the actuating motor and gear unit, making it possible for the shaft end to be damaged during transport if the motor is accidentally dropped. This can lead to an undesirable whipping of the shaft or damage to the first toothed part.

2. Background of the Invention:

Accordingly, it is an object of the present invention to considerably reduce the threat of damage to an actuating motor of the above-mentioned type prior to assembly with the gear unit.

Pursuant to this object, and others which will become apparent hereafter, one aspect of the present invention resides in attaching a bearing shield at the motor housing with a bearing shield attachment flange for connection with the motor housing. A bearing shield side wall includes a through opening for the second toothed part and embraces the shaft end section. A bearing shield end wall is provided on the side of the first toothed part facing away from the motor housing in whose region a bearing area for the shaft end section is configured.

In the invention, the electric actuating motor is initially provided with the bearing shield. The shock loads occurring during transportation are for the most part kept away from the sensitive shaft, as well as from the first toothed part, since these shocks can be directly transmitted by the bearing shield to the motor housing. An additional advantage of this embodiment of the invention resides in that the first toothed part is supported on both sides and thus is in a mechanically more stable position.

In a further embodiment of the invention, the external peripheral surface of the side wall is cylindrical. During the course of assembly of the actuating motor with the housing, the motor need merely be slid into a corresponding cylindrical receiving opening of the gear unit housing, thereby providing the advantage of an accurate positioning in the gear unit housing. It is also possible to actually displace the actuating motor in the gear unit housing opening for a precise mutual positional adjustment of the first and the second toothed parts in order to assure satisfactory operation of the gear unit.

Alternatively, the external peripheral surface of the side wall can also be designed to taper conically towards the end wall. This embodiment is principally advantageous if a final axial adjustment is not required. The advantage of this arrangement lies in that a mechanically stable connection which is free of play between the motor and gear unit is assured because of the conical seat in a correspondingly conical housing receiving opening, even if the conical surfaces should include manufacturing inaccuracies.

In yet another embodiment an axial play adjustment element is provided for elimination of excessive axial play of the shaft. This adjustment element is supported at the end wall and engages at the shaft end section. An adjustment screw is the preferred structure of the adjusting element. The adjustment or the elimination of axial play is important mainly if, according to a preferred embodiment of the invention, the first toothed part is a worm which co-acts with a worm wheel which constitutes the second toothed part. During operation, the shaft is then stressed in one or the other axial direction, depending on the direction of rotation. This stress change, which occurs when the direction of rotation is reversed, can result in impact shock on the shaft in the axial direction in the case where axial play of the shaft is excessive, thus, leading to increased wear and noise generation. This axial play can be eliminated by the axial play adjustment element.

Preferably, the gear unit housing is attachable directly at the bearing shield. For this purpose, the attachment flange can be formed by an annular flange projecting radially outwards from the side wall, with threading-in apertures for the gear unit housing attachment bolts.

A preferred embodiment of the invention is described below with the help of the following drawings.

BRIEF DESCRIPTION OF THE DRAWINGS:

FIG. 1 is a side view of an electric actuating motor according to the invention;

FIG. 2 is a front view (in the direction of arrow II in FIG. 1) of the actuating motor inserted into a gear unit housing from which the gear unit cover has been removed according to FIG. 1, partially in along line II—II in FIG. 3; and FIG. 3 is a section of the arrangement in FIG. 2, with the installed gear unit cover in section along the line III—III in FIG. 2.

DETAILED DESCRIPTION OF THE PREFERRED EMBODIMENT:

The electric actuating motor depicted in FIG. 1, essentially comprises a cylindrical motor housing 12, in which a shaft 14 with a shaft axle 16 is rotatably supported. A shaft end section 18 projects at one of its end faces from the motor housing 12. This section 18 carries a worm 20, as a first toothed part, which, after assembly of the electric motor 10 with a gear unit 21, meshes with a worm wheel 22 of the gear unit 21 which is the second toothed part. At the above-mentioned end face 24 of the motor housing 12, a fastening flange 26 of a bearing shield 28 is attached in a non-depicted manner (for example, by means of flush or countersunk attachment bolts).

A side wall 30 embraces the shaft end section 18, and emanates from the inside edge of the flange 26 which is shaped as a circular disk. The side wall 30 terminates in an end wall 32, and the bearing shield 28 is thus approximately hat-shaped. The side wall 30 tapers in a slightly conical manner (the angle of inclination being less than 5 degrees, preferably less than 2 degrees, ideally approximately less than 1 degree) towards the side wall 30 in the embodiment depicted. For other application purposes, a side wall 30 with a cylindrical external peripheral surface is also conceivable.

Correspondingly, a conical inner peripheral surface 35 of a receiving opening 34 of the gear unit 21 is assigned to the slightly conical outer peripheral surface 36 of the side wall 30.

An adjustment screw 38 is threaded into the end wall 32, and the tip 40 thereof is located in an inner space 44 of the bearing shield 28 and rests at an end front face 42 of the shaft end section 18 or is slightly spaced from this surface, so as to correspond with a desired maximum axial play of the shaft 14 in the actuating motor 10.

The worm 20 is supported on both sides, namely, on one side in the motor housing 12 in a non-depicted manner, and on the other side in the region of the end wall 32 by a bearing ring 46. This bearing ring 46 is similar to a type of spherical bearing inserted with its spherical external peripheral surface into a correspondingly spherically designed bearing receptacle 48 in the wall region of the side wall 30, shown at the top of FIG. 3, and facing the end wall 32. Because of this spherical bearing, there results an automatic angular adjustment of the bearing ring 46 with appropriately smooth shaft operation resulting in little wear.

The actuating motor is provided with the bearing shield 28 immediately after assembly, so as to form a transportation unit (an arrangement as depicted in FIG. 1) which is insensitive to shock-like loadings, particularly when the motor is dropped. During later assembly with the gear unit 21, the electromotor 10 with the bearing shield is first inserted into the abovementioned receiving opening 34, until the outer cone, and the inner cone firmly strike one other. The gear unit 21, according to FIGS. 2 and 3, consists of a gear unit housing 50 having the receiving opening 34, and a gear unit shaft 52 having the already mentioned worm wheel 22 and a second worm wheel 54 axially parallel to the worm 20. This second worm wheel 54 meshes with a worm 56 arranged on the shaft 52, so as to be spaced from the worm wheel 22. Depending upon the design of the gear unit, one can achieve a transmission ratio of 1 to 1,000.

The two ends of the shaft 52 are rotatably supported in spherical bearings with bearing rings 52 in the gear unit housing 50. In the finally assembled state, the worm wheel 22 meshes with the worm 20. For this meshing to occur, the worm wheel 22 penetrates through an appropriately dimensioned passage opening 60 in the side wall 30.

After inserting the bearing shield 28 into the receiving opening 34, the gear unit housing 50 is rigidly fixed at the bearing shield 28, for instance, by means attachment bolts 64 indicated in FIG. 3 which can be threaded into threaded bores 66 of the attachment flange 26. Subsequently, the shaft 52 is inserted from above into the gear unit housing 50 wherein the worm wheel 22 is moved into the through aperture 60 in the side wall 30 by appropriate momentary inclination or possibly oblique positioning of the shaft 52 and its sidewise displacement. After the bearing rings 58 are installed into their assigned bearing apertures 62 of the gear unit housing 50, the gear housing cover 68, shown in FIG. 3, is installed and fastened at the gear unit housing 50 (fastening thread 70 being provided in the gear unit housing 50 for an appropriate fastening bolt).

While the invention has been illustrated and described as embodied in an electric actuating motor with gear unit for a motor vehicle, it is not intended to be limited to the details shown, since various modifications and structural changes may be made without departing in any way from the spirit of the present invention.

What is claimed is new and desired to be protected by Letters Patent is set forth in the appended claims.

We claim:

1. An electrical actuating motor with a gear unit for use in a motor vehicle, comprising:
    a motor housing;
    a shaft rotatably supported in said motor housing so that an end section of said shaft is arranged externally of said motor housing, said shaft end having a first toothed part provided so as to be engageable with a second toothed part of the gear unit; and
    a bearing shield having a bearing shield attachment flange provided so as to attach said bearing shield to said motor housing, said bearing shield having a bearing shield side wall with a passage arranged therein for said second toothed part and so as to embrace said shaft end section, said bearing shield further including a bearing shield end wall at a side of said first toothed part and facing away from said motor housing, a bearing area for said shaft end section being provided in the region of said bearing shield end wall, said gear unit including a gear unit housing having an opening with a side wall, said bearing shield being insertable into said opening so that said bearing shield side wall engages said housing opening sidewall.

2. An actuating motor as defined in claim 1, wherein said bearing shield side wall has a cylindrical outer peripheral surface.

3. An actuating motor as defined in claim 1, wherein said bearing shield side wall has an outer peripheral surface which tapers conically towards said bearing shield end wall.

4. An actuating motor as defined in claim 3, wherein said wall has an angle of inclination that is less than 5 degrees.

5. An actuating motor as defined in claim 4, wherein said side wall has an angle of inclination that is less than 2 degrees.

6. An actuating motor as defined in claim 5, wherein said side wall has an angle of inclination that is less than 1 degree.

7. An actuating motor as defined in claim 1; and further comprising an axial play adjustment element provided so as to abut at said end wall and engage said shaft end section.

8. An actuating motor as defined in claim 7, wherein said axial play adjustment element is an adjustment screw.

9. An actuating motor as defined in claim 1, wherein said bearing shield attachment flange is formed by an annular flange which projects radially outward from said bearing shield side wall.

10. An actuating motor as defined in claim 1, wherein said gear unit housing is attachable at said bearing shield.

11. An actuating motor as defined in claim 10, wherein said attachment flange is provided with threaded bores into which gear unit attachment bolts are receivable.

12. An actuating motor as defined in claim 1, wherein said first toothed part is a worm and said second toothed part is a worm wheel.

* * * * *